US008495625B1

(12) United States Patent
Sanders (10) Patent No.: US 8,495,625 B1
(45) Date of Patent: Jul. 23, 2013

(54) METHOD AND SYSTEM FOR CREATION OF STREAMED FILES ON-DEMAND

(75) Inventor: James Sanders, Pacifica, CA (US)

(73) Assignee: Symantec Corporation, Mountain View, CA (US)

( * ) Notice: Subject to any disclaimer, the term of this patent is extended or adjusted under 35 U.S.C. 154(b) by 393 days.

(21) Appl. No.: 12/844,496

(22) Filed: Jul. 27, 2010

(51) Int. Cl.
*G06F 9/445* (2006.01)

(52) U.S. Cl.
USPC ............................. 717/177; 717/174; 717/178

(58) Field of Classification Search
None
See application file for complete search history.

(56) References Cited

U.S. PATENT DOCUMENTS

| | | |
|---|---|---|
| 5,487,167 A | 1/1996 | Dinallo et al. |
| 5,581,764 A | 12/1996 | Fitzgerald et al. |
| 5,708,796 A | 1/1998 | Ozden et al. |
| 5,712,976 A | 1/1998 | Falcon, Jr. et al. |
| 5,742,768 A | 4/1998 | Gennaro et al. |
| 5,745,380 A | 4/1998 | Sandvoss et al. |
| 5,754,774 A | 5/1998 | Bittinger et al. |
| 5,761,477 A | 6/1998 | Wahbe et al. |
| 5,764,235 A | 6/1998 | Hunt et al. |
| 5,765,164 A | 6/1998 | Prasad et al. |
| 5,787,284 A | 7/1998 | Blainey et al. |
| 5,802,292 A | 9/1998 | Mogul |
| 5,835,749 A | 11/1998 | Cobb |
| 5,878,223 A | 3/1999 | Becker et al. |
| 5,919,247 A | 7/1999 | Van Hoff et al. |
| 5,933,644 A | 8/1999 | Wallace |
| 5,974,129 A | 10/1999 | Bodnar |
| 5,978,788 A | 11/1999 | Castelli et al. |
| 5,978,791 A | 11/1999 | Farber et al. |
| 6,003,087 A | 12/1999 | Housel, III et al. |
| 6,009,410 A | 12/1999 | LeMole et al. |
| 6,073,129 A | 6/2000 | Levine et al. |

(Continued)

FOREIGN PATENT DOCUMENTS

| | | |
|---|---|---|
| WO | WO97/00475 | 1/1997 |
| WO | WO97/46955 | 12/1997 |
| WO | WO98/11723 | 3/1998 |

OTHER PUBLICATIONS

Douglas Thain and Miron Livny, The Case for Sparse Files, Jan. 10, 2003, University of Wisconsin Computer Science Department, Technical Report 1464, pp. 1-15.*

(Continued)

*Primary Examiner* — Thuy Dao
*Assistant Examiner* — Stephen Berman
(74) *Attorney, Agent, or Firm* — Rory D. Rankin; Meyertons, Hood, Kivlin, Kowert & Goetzel, P.C.

(57) ABSTRACT

A system and method for on-demand application delivery. A computing system comprises a streaming server and a client computer coupled to one another via a network. In response to a request to install a given application on the client computer, the client computer sends a streaming request to the streaming server for retrieving files from an installation snapshot. The client computer identifies files determined to be utilized during an initial launch and execution of the given application. For these identified files, the client computer creates a corresponding physical file. For other files, the client computer adds corresponding metadata in an index of files and no physical file is created at this time. For file system access requests, the client computer utilizes the metadata stored within the index of files to handle the requests. In response to a request for access to a file not installed on the client, a request is generated to retrieve the file from the server.

20 Claims, 7 Drawing Sheets

U.S. PATENT DOCUMENTS

| | | | | |
|---|---|---|---|---|
| 6,088,524 | A | 7/2000 | Levy et al. | |
| 6,122,628 | A | 9/2000 | Castelli et al. | |
| 6,311,221 | B1* | 10/2001 | Raz et al. | 709/231 |
| 6,574,618 | B2* | 6/2003 | Eylon et al. | 707/1 |
| 6,757,894 | B2* | 6/2004 | Eylon et al. | 717/177 |
| 7,024,527 | B1 | 4/2006 | Ohr | |
| 7,051,315 | B2 | 5/2006 | Artzi et al. | |
| 7,197,570 | B2* | 3/2007 | Eylon et al. | 709/231 |
| 7,386,674 | B1* | 6/2008 | Lango | 711/137 |
| 7,567,994 | B2* | 7/2009 | Adkins et al. | 707/204 |
| 7,577,751 | B2* | 8/2009 | Vinson et al. | 709/231 |
| 7,606,924 | B2 | 10/2009 | Raz et al. | |
| 7,735,057 | B2 | 6/2010 | Rachman et al. | |
| 7,779,034 | B2* | 8/2010 | Pedersen et al. | 707/781 |
| 8,209,680 | B1* | 6/2012 | Le et al. | 717/174 |
| 2001/0037399 | A1* | 11/2001 | Eylon et al. | 709/231 |
| 2002/0087717 | A1* | 7/2002 | Artzi et al. | 709/236 |
| 2002/0087963 | A1* | 7/2002 | Eylon et al. | 717/174 |
| 2002/0157089 | A1* | 10/2002 | Patel et al. | 717/178 |
| 2003/0084439 | A1* | 5/2003 | Perkins et al. | 717/177 |
| 2004/0230971 | A1 | 11/2004 | Rachman et al. | |
| 2005/0193139 | A1* | 9/2005 | Vinson et al. | 709/231 |
| 2006/0184587 | A1 | 8/2006 | Federwisch et al. | |
| 2008/0010630 | A1 | 1/2008 | Ou-Yang et al. | |
| 2009/0070757 | A1* | 3/2009 | Bak et al. | 717/177 |
| 2009/0271782 | A1* | 10/2009 | Ciudad et al. | 717/174 |
| 2010/0011353 | A1* | 1/2010 | Chalupa et al. | 717/177 |
| 2011/0029968 | A1* | 2/2011 | Sanders et al. | 717/178 |
| 2011/0296394 | A1* | 12/2011 | Vidal et al. | 717/171 |

OTHER PUBLICATIONS

Kuacharoen et al., "Software Streaming via Block Streaming", A Jerraya et al. (eds.), Embedded Software for SOC, 435-12, 2003, pp. 435-448.*

Reimer et al., "Opening Black Boxes: Using Semantic Information to Combat Virtual Machine Image Sprawl", VEE '08 Mar. 5-7, 2008, pp. 111-120.*

Chen et al., "Fast, On-demand Software Deployment with Light-weight, Independent Virtual Disk Images", 2009 Eighth International Conference on Grid and Cooperative Computing, pp. 16-23.*

Yang Yu, et al: "A Feather-weight Virtual Machine for Windows Applications"; Jun. 14, 2006; pp. 24-34.

Japanese Patent Application Laid-open No. Hei 10-133976.

Japanese Patent Application Laid-open No. Sho 64-36332.

Japanese Patent Application Laid-open No. Hei 10-162057.

G. Glass, "A Universal Streaming Service", C++ Report, Apr. 1996, pp. 74-76 and 81-83.

T. Ritchey, "Java!", New Riders Publishing, Dec. 1995, pp. 214-216.

Chen, Z. et al., (Dec. 11-14, 1995) "Real time video and audio in the world wide web" World Wide Web Journal, Fourth International World Wide Web Conference, pp. 333-348.

Jiang, Z. and Kleinrock, L. (1997) "Prefetching links on the WWW" IEEE International Conference on Communications (ICC), US, New York, NY: IEEE, pp. 483-489.

M. Schwartz, "Telecommunication Networks: Protocols, Modeling and Analysis", Jan. 1, 1987; Addison-Wesley Publishing Company, pp. 266-283.

J. Basu et al., "Degrees of Transaction Isolation in SQL *Cache: A Predicate-based Client-side Caching System", May 15, 1996, pp. 1-22.

Amit Shukla et al., "Storage Estimation for Multidimensional Aggregates in the Presence of Hierarchies", VLDB Conference Mumbai (Bombay), 1996, pp. 522-531.

Dale Skeen, "New Forms of Persistent Queries Are Necessary to Handle Live Business Data as it Speeds Through a Company", internet website www.byte.com BYTE Magazine, Feb. 1998, 5pgs.

V. Hoff et al., "The Open Software Description Format (OSD)", internet website www.w3.org, Aug. 11, 1997, pp. 1-13.

Red Brick Vista, "Aggregate Computation and Management", internet website www.informix.com, printed Oct. 4, 2000.

Fireclick, "Web Site Performance is Key to E-Commerce Sucess", internet website www.Fireclick.com printed, Nov. 1, 2000.

Boost Web Optimizer Technology Overview, "How it Works", Sep. 27, 2000 and internet website www.boostworks.com printed Nov. 1, 2000.

"Delivering Windows to the Net White Paper", WinToNet by Menta Software, 2000 and Website http://216.205.21.102/ printed Nov. 1, 2000.

"First There was Streaming Audio, then Streaming Video. Now get ready for Streaming Software", Stream Theory White paper and Website www.Streamtheory.com printed Sep. 22, 2000.

"OSD Describing Software Package on the Internet", Marimba Inc. White paper 1998 and wedsite www.marimba.com, printed Nov. 1, 2000.

"Timbale for Windows Terminal Services" Marimba Promotional document, undated, 2000.

Japanese Patent Application Laid-open No. Hei 8-51596.

Japanese Patent Application Laid-open No. Hei 10-91446.

Japanese Patent Application Laid-open No. Hei 7-271603.

Japanese Patent Application Laid-open No. Hei 8-6878.

* cited by examiner

METHOD AND SYSTEM FOR CREATION OF STREAMED FILES ON-DEMAND

BACKGROUND OF THE INVENTION

1. Field of the Invention

This invention relates to the field of computer networks and, more particularly, to on-demand application delivery.

2. Description of the Related Art

As computer performance increases for desktops and servers and computer memory storage and data bandwidth increase, so does the amount and complexity of data that business and industry daily manage. A large portion of the data involves corporate information managed for a company or workgroup by one or more servers. The hardware and software components of these servers provide employees and customers the ability to search, access and update the corporate information such as electronic documents, email messages, announcements, tasks, discussion topics, and so forth. For an information technology (IT) administrator to centralize management of the corporate information and the computing support for employees and customers, an IT administrator may utilize a datacenter. A datacenter is a centralized repository, either physical or virtual, for the storage, management, and dissemination of this corporate information. A datacenter may also be referred to as a server room or a server farm.

A datacenter may also act as a restricted access area containing automated systems that constantly monitor server activity, Web traffic, and network performance. In addition to all of these demands of running and supporting a datacenter, an IT administrator regularly updates computing environments for employees and customers for continued utilization of the corporate information. Employees and customers may be referred to as end-users. End-users perform tasks on the corporate information from desktops and servers in an office, from personal computers at home, and from laptops in remote locations.

Administering and supporting an IT infrastructure as described above on a large number of end-user systems presents significant challenges. An increasing number of mobile and remote end-users make traditional application delivery less reliable. An increasing mobility of end-users between computers complicates application delivery and license management. Techniques to enhance datacenter agility include multiprocessing and virtualization. However, with so many distributed systems, it may be slow and/or difficult to roll out new applications, update existing ones and remove obsolete ones.

In view of the above, improved systems and methods for on-demand application delivery are desired.

SUMMARY OF THE INVENTION

Systems and methods for on-demand application delivery.

In one embodiment, a computing system comprises a streaming server and a client computer couple to one another via a network. The streaming server is configured to stream a plurality of files comprised within an installation snapshot corresponding to a given application. The client computer is configured to identify a subset of the plurality of files for file creation during installation. The identified files comprised within the subset may be the only files determined or identified to be utilized during an initial launch and execution of the given application. In response to a request to install the given application in a target environment on the client computer, the client computer retrieves files from the streaming server. If the client computer detects a given file is included in the identified subset, then the client computer creates a corresponding physical file in the target environment for the given file. If the client computer does not detect a given file is included in the identified subset, then the client computer adds corresponding metadata for the given file in an index of files. No physical file is created at this time. Therefore, no unique table entry within a file system is allocated for the given file. For file system requests, such as directory query requests and file open and create requests, the client computer utilizes the metadata stored within the index of files to handle the requests.

These and other embodiments will be appreciated upon reference to the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Figure 1:
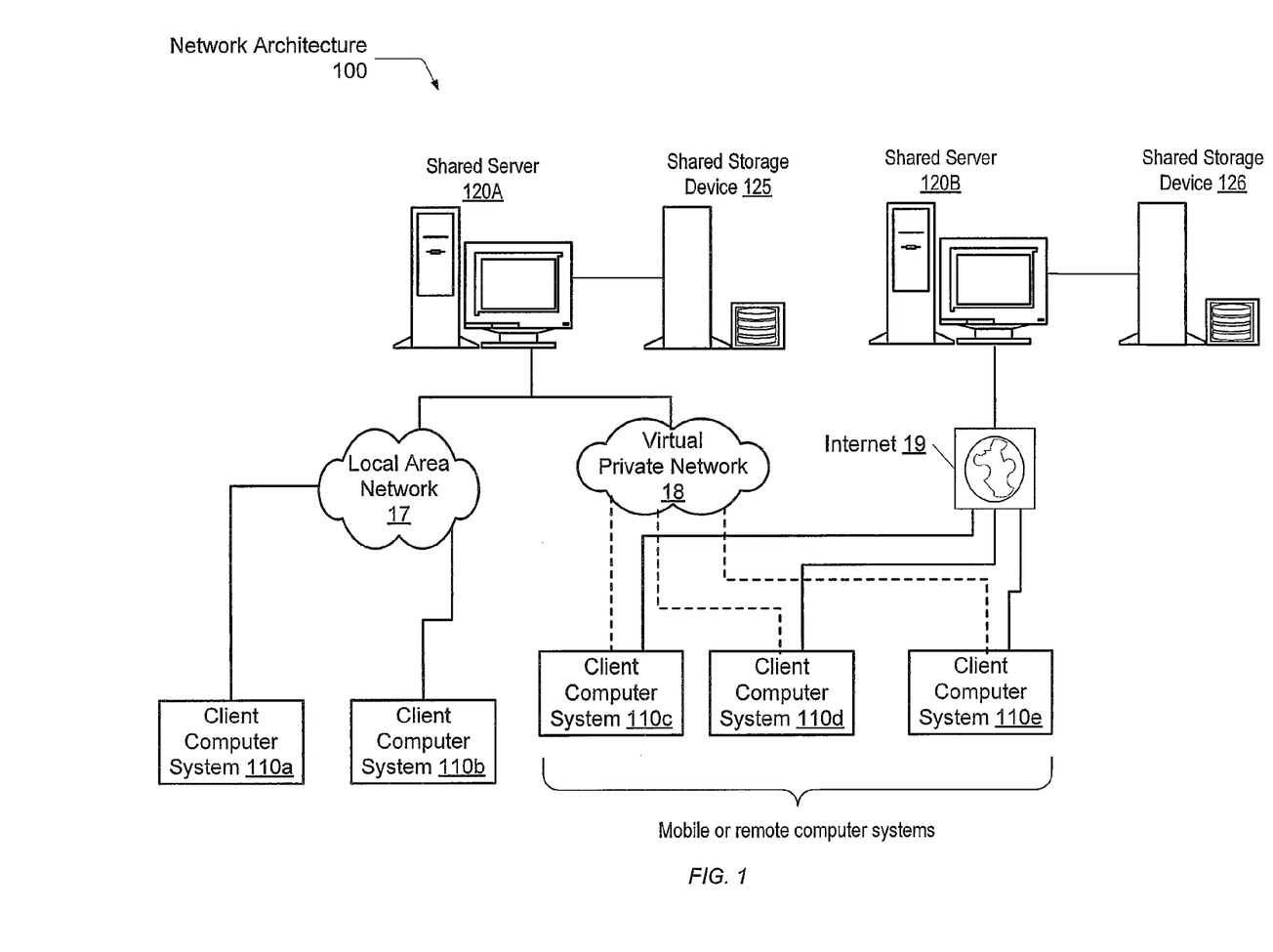
FIG. 1 is a generalized block diagram illustrating one embodiment of a network architecture.

Various embodiments of a system and method for streaming an install package into a virtual environment are described herein. Referring to FIG. 1, a generalized block diagram illustrating one embodiment of a network architecture including a capability for streaming an installation snapshot of a given application is shown. As shown, the network architecture 100 includes client computing systems 110a-110b interconnected through a local area network 17 to one another and to a shared server 120a. The network architecture 100 also includes client computing systems 110c-110e interconnected through virtual private network 18 to one another and shared server 120a. Network 17 may be coupled to the second network 18 through one or more switches not shown for ease of illustration. In addition, the client computing systems 110c-110e are coupled to shared server 120b through the Internet 19 or other outside network. Again, one or more switches (not shown) may be used to couple computing systems and servers to the Internet 19. Shared storage device 125 is coupled to the shared server 120a. Likewise, shared storage device 126 is coupled to the shared server 120b. In one embodiment, the shared servers 120a-120b are file servers and the shared storage devices 125-126 comprise shared hard disk storage.

It is noted that in alternative embodiments, the number and type of client computers and servers, switches, networks and shared storage is not limited to those shown in FIG. 1. At various times one or more clients may operate offline. In addition, during operation, individual client computer connection types may change as users connect, disconnect, and reconnect to network architecture 100. A further description of each of the components shown in FIG. 1 is provided shortly. First, an overview of some of the features provided by the client computers is described.

In one embodiment, the shared servers 120a-120b may store one or more software applications on shared storage devices 125-126. Examples of the stored software applications may include e-mail, word processing, spreadsheet, and other office productivity applications, specialized applications for handling graphics, images, audio files, video files, performing numeric calculations and the like. Numerous other software applications are known and are contemplated. During operation, each of the client computing systems 110a-110e may request, obtain, install, and execute one or more of these software applications.

An application that is chosen by a client computer may be converted to a series of data chunks or blocks of code on a corresponding shared server. These blocks of code may be transmitted, or streamed, to the requesting client computer. When the client computer receives the blocks of code, the client computer may execute steps of an installation process. When the client computer installs a streamed application either in a physical system or in a virtual environment, several empty or sparse files may be physically created within the client computer. At a later time, the corresponding data may be streamed to the client computer. The client computer may allocate a file system table entry for each of the empty or sparse files. Many applications comprise a large number of files, such as 4,000 files or more. Installing such a large number of files may be time consuming.

When the receiving client computer executes an application, the application may access a small portion of the large number of installed files. Files included in this small portion may be known and included in a list. The files in this list may be physically created on the client computer during the installation process. The remainder of the large number of files that are not included in this list may not be physically created at this time let alone as empty files or as sparse files. The remainder of the large number of files may not be physically created during the installation process. Rather, a separate file, which may be referred to as an index of files, may be created on the client computer and include metadata corresponding to each of the large number of files not physically created.

The index of files described above may be stored in a single file on the client computer receiving the streamed application. Alternatively, the index of files may be stored in separate files, each file stored in a corresponding folder and comprising at least metadata for the files within the folder that have not yet been created. A streaming filter driver within the client computer receiving the streamed application may intercept access requests to a file system and utilize the index of files to handle the requests. For example, for a directory query request, the streaming filter driver may merge the metadata of the physical files within a corresponding folder with the metadata of files not yet created in the corresponding folder. The merged metadata may be presented to an end-user or to user applications. The presenting of the merged metadata allows the files not yet created in the corresponding folder to be viewed or listed as if they physically exist.

Another example of an access request intercepted by the streaming filter driver may be an open/create request for a particular file, folder or directory. The streaming filter driver may determine whether (i) a given file has metadata in the index of files and (ii) no physical file associated with the given file exists in a corresponding folder. In response to this determination, the streaming filter driver may create a physical file in the corresponding folder for the given file. In order to create the physical file, the streaming filter driver may use metadata in the index of files and request corresponding data to be streamed from the streaming server.

FIG. 1 illustrates an example of a system capable of the described features according to one embodiment. Further details are provided below. Referring to FIG. 1, a further description of the components of network architecture 100 is provided here. Client computer systems 110a-110e are representative of any number of stationary or mobile computers such as desktop personal computers (PCs), workstations, laptops, handheld computers, servers, personal digital assistants (PDAs), smart phones, and so forth. Client computing systems 110a-110e and shared servers 120a-120b may operate as peers in a peer-to-peer configuration, as clients and servers in a client/server configuration, or a combination or peer-to-peer and client/server configurations. Each of the client computing systems 110a-110e may, for example, be used by a particular user or member of a business or other organization, a home user(s), or otherwise.

Generally speaking, client computer systems 110a-110e include one or more processors comprising one or more processor cores. Each processor core includes circuitry for executing instructions according to a predefined general-purpose instruction set. For example, the x86 instruction set architecture may be selected. Alternatively, the Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a hard disk drive.

Each processor core and memory hierarchy within a client computer system may be in turn connected to a network interface. In addition to hardware components, each of the client computer systems 110a-110e may include a base operating system (OS) stored within the memory hierarchy. The base OS may be representative of any of a variety of specific operating systems, such as, for example, MS-DOS®, MS-WINDOWS®, OS/2®, UNIX®, Linux®, Solaris® or another known operating system. As such, the base OS may be operable to provide various services to the end-user and provide a software framework operable to support the execution of various programs. Additionally, each of the client computer systems 110a-110e may include a hypervisor used to support higher-level virtual machines (VMs). As is well known to those skilled in the art, virtualization may be used in desktops and servers to fully or partially decouple software, such as an OS, from a system's hardware. Virtualization may provide an end-user with an illusion of multiple OSes running on a same machine each having its own resources.

Networks 17 and 18 may include a variety of techniques including wireless connection, direct local area network (LAN) connections, wide area network (WAN) connections such as the Internet, a router, and others. Networks 17 and 18 may further include remote direct memory access (RDMA) hardware and/or software, transmission control protocol/internet protocol (TCP/IP) hardware and/or software, router, repeaters, switches, grids, and/or others. Protocols such as Ethernet, Fibre Channel, Fibre Channel over Ethernet (FCoE), and so forth may be used in networks 17 and 18. The networks 17 and 18 may interface with a set of communications protocols used for the Internet 19 such as the Transmission Control Protocol (TCP) and the Internet Protocol (IP), or TCP/IP. Switch 150 may be a TCP/IP switch. In one embodiment, computing system 100 or a portion thereof may be implemented as part of a cloud-computing environment.

Each of the shared storage devices 125-126 may be used for the sharing of data among different computers and servers, such as the client computer systems 110a-110e. Each of the shared storage devices 125-126 may include a storage subsystem for data storage. In one embodiment, the storage subsystem comprises one or more hard disks, often arranged into logical, redundant storage containers or RAID arrays (redundant arrays of inexpensive/independent disks). Alternatively, the shared storage devices 125-126 may include or be further coupled to several varieties of storage consisting of one or more tape drives, server blades, or specialized devices, and may include a variety of memory devices such as RAM, Flash RAM, MEMS (Micro Electro Mechanical Systems) storage, battery-backed RAM, and/or non-volatile RAM (NVRAM), etc.

The shared servers 120a-120b in network architecture 100 may be any kind of server configured to store data. In one embodiment, each of the shared servers 120a-120b may be a file server, such as a Network-Attached Storage (NAS) device. Each of the shared servers 120a-120b may be a computer specialized for providing file storage services to client computing systems 110a-110e and other information servers (not shown). The operating system and other software on each of the shared servers 120a-120b may provide the functionality of file systems, the access to files, and the management of these functionalities.

Figure 2:
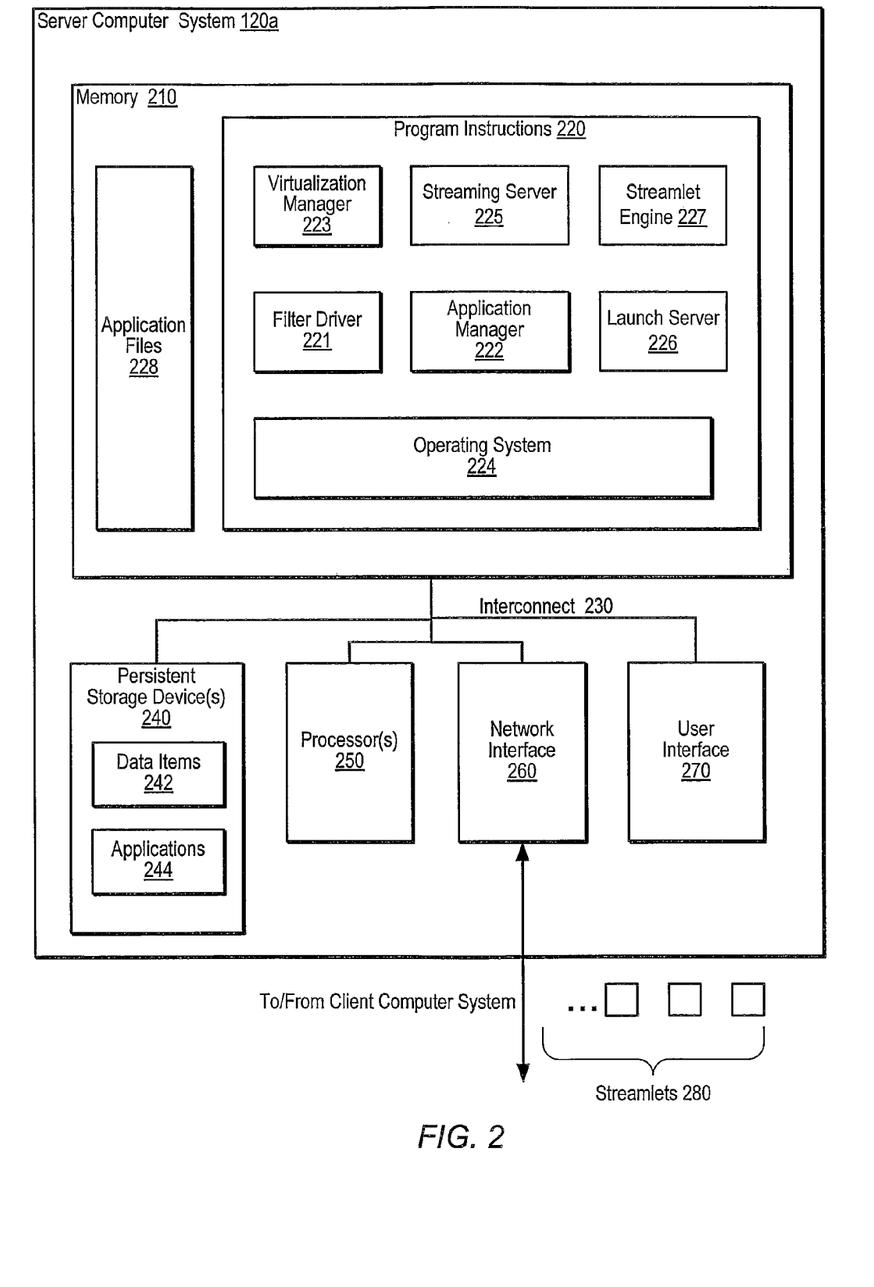
FIG. 2 is a generalized block diagram illustrating one embodiment of a shared server computer system.

Turning now to FIG. 2, a generalized block diagram illustrating one embodiment of a shared server computer system 120 is shown. It is noted that FIG. 2 is provided as an example for purposes of discussion, and in other embodiments the shared server computer system 120a may take on various other forms. Shared server computer system 120a may be representative of any of shared server computer systems 120a-120b described herein. Similarly, the shared server computer system 120a may be used to implement any of the below-described methods. The shared server computer system 120a may be any of various types of devices, including, but not limited to, a personal computing system, desktop computer, laptop or notebook computer, mainframe computing system, handheld computer, workstation, network computer, or in general any type of computing device.

The shared server computer system 120a may include one or more processors 250, each of which may include one or more cores, any of which may be single or multi-threaded. The shared server computer system 120a may also include one or more persistent storage devices 240 (e.g. optical storage, magnetic storage, hard drive, tape drive, solid state memory, etc), which may include various data items 242 (e.g., files) and/or applications 244. Example applications include databases, email applications, office productivity applications, and a variety of others as known in the art.

The shared server computer system 120a may include one or more memories 210 (e.g., one or more of cache, SRAM, DRAM, RDRAM, EDO RAM, DDR 10 RAM, SDRAM, Rambus RAM, EEPROM, etc.). The shared server computer system 120a may also include one or more network interfaces 260 for transmitting and receiving data, such as to or from client computing systems 110a-110e, as described herein. The shared server computer system 120a may further include one or more user interfaces 270 for receiving user input or displaying output to users, such as a keyboard, mouse or other pointing device, touch screen, and a monitor or other visual display device. Various embodiments may include fewer or additional components not illustrated in FIG. 2 (e.g., video cards, audio cards, additional network interfaces, peripheral devices, a network interface such as an ATM interface, an Ethernet interface, a Frame Relay interface, etc.).

One or more of the system memories 210 may contain program instructions 220. Program instructions 220 may be encoded in platform native binary, any interpreted language such as Java® byte-code, or in any other language such as C/C++, Java®, etc or in any combination thereof. According to the illustrated embodiment, program instructions 220 may comprise specific modules executable to implement one or more operating systems 224, such as the Windows® operating system, the Solaris® operating system, and/or the Linux® operating system. In addition, program instructions 220 may include modules to implement one or more of a filter driver 221, an application manager 222, a virtualization manager 223, a streaming server 225, a launch server 226, and streamlet engine 227. One or more of the system memories 210 may also contain application files 228. Program code included in program instructions 220 can be combined together or separated into various modules as desired, according to a particular embodiment.

During operation, launch server 226 may be used to view applications that are available to be streamed and to select an application to be streamed to one of the client computing systems 110a-110e. An application that is chosen for streaming may be converted to a series of streamlets 280 by streamlet engine 227. Streamlets, as used herein, are blocks into which an application is divided such that blocks of program code and/or data that are used to run the application are transmitted first, thereby allowing the application to be launched with reduced latency. In one embodiment, streamlets may be 4-kilobyte (KB) blocks.

Once streamlet engine 227 has generated streamlets 280, the streaming server 225 may deliver the streamlets 280 to any one of the client computing systems 110a-110e. In one embodiment, streamlet engine 227 may convey streamlets to a client computing system irrespective of an environment in the client computing system targeted for installation of the streamlets. In various embodiments, streamlet engine 227 may add a tag to each streamlet that identifies a particular environment in the client computing system into which the software application corresponding to the streamlet is to be installed.

Various types of software applications may be converted to streamlets by streamlet engine 227. In one embodiment, software applications that have first been converted to install packages, or install snapshots, prior to conversion to streamlets may be streamed to a client. An install package, as used herein, refers to a set of files that have been organized into a package that may be received and processed by an installation component. An install package may also be referred to as an install snapshot. For example, the Windows® Installer Service is a well known service that may be used to install, maintain, and remove MSI install packaged software applications—typically on a system that uses a Microsoft Windows operating system. An install package may include files corresponding to one or more software products.

In one embodiment, the functions of application manager 222, virtualization manager 223, and filter driver 221 may be replaced by a corresponding application manager, virtualization manager, and filter driver located on a client computing system that perform functions that are described in detail below (e.g., application manager 322, virtualization manager 323, and filter driver 321 in FIG. 3). In an alternative embodiment, the functions of client-side versions of application manager 322, virtualization manager 323, and filter driver 321 may be performed on the server by application manager 222, virtualization manager 223, and filter driver 221. Various combinations of where such components are located are possible and are contemplated.

Figure 3:
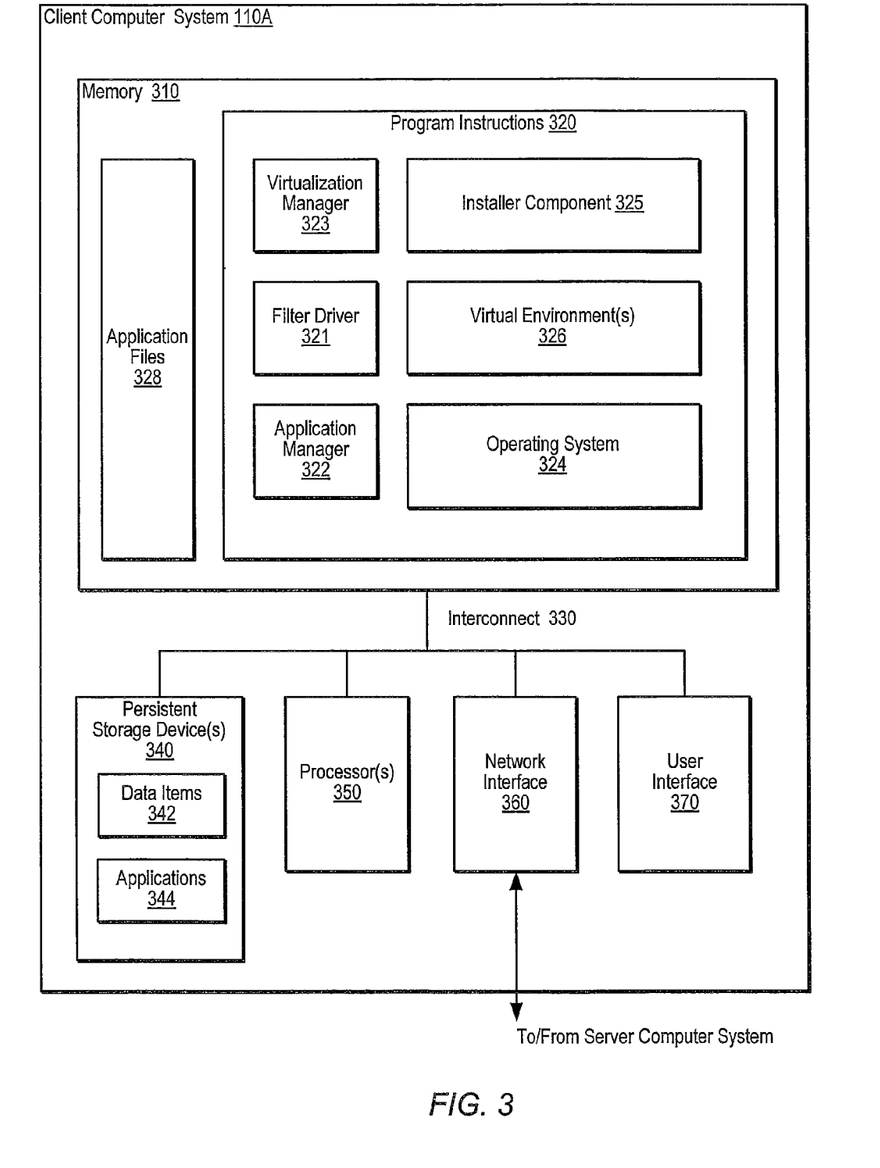
FIG. 3 is a generalized block diagram illustrating one embodiment of a client computing system.

Turning now to FIG. 3, a generalized block diagram illustrating one embodiment of a client computing system 110a that may receive a streamed install package is shown. It is noted that FIG. 3 is provided as an example, and in other embodiments the client computing system 110a may take on various other forms. Similarly, client computing system 110A may be used to implement any of the below-described methods. During operation, in one embodiment, application manager 322 may generate a request to receive a streamed install package corresponding to a software application that is to be installed on the client computing system 110a. In response to a request, application manager 322 may receive streamlets 280 that correspond to the requested package.

In some embodiments, the application manager 322 may temporarily store each received streamlet in a local buffer or memory (not shown). If the target of installation for the requested software application is a physical (non-virtual) environment, then the application manager 322 may cause the Installer Component 325 to perform such an installation. For example, Windows Installer Service, an installation and configuration service provided by Microsoft Windows may be used to install MSI install packages. In other embodiments, an alternative service may be utilized to perform installation and configuration services. In one embodiment, installer component 325 includes an installer service that performs a series of actions specified by sequence tables in an installation database. These actions may generate a script that provides instructions for performing the installation. The installer service may then send the generated script for execution to another component of installer component 325 that uses the generated script to perform installation operations. For example, Windows Installer Service and MSI Executable may perform the functions of installer component 325.

Each of the client computing systems 110a-110e may comprise components used to install a streamed install package received from a streaming server. The components may include both a system environment and a virtual environment. The streamlets 280 may be received by each of the client computing systems 110a-110e. One or more filter drivers and installer service components may determine the target environment (physical or virtual), register and maintain a record of processes configured to operate within the chosen target environment, and handle file system writes and changes to an operating system registry which effects on the chosen target environment.

Typically, files that have been extracted from streamlets 280 and installed in a target environment include a header and data. The header may include items such as a file identifier (ID) and a size of the file. The data may be a variable length field containing the actual content of the file. However, other received files may include a marker or other indication that not all of the file data is present. These types of files, which may be referred to as "stub" files or "sparse" files, stand in for an actual file and include a marker. In one embodiment, a filter driver may also register the file as a sparse file, such as by maintaining and adding an entry including a file identifier to a table of sparse files. Alternatively, the stored sparse file itself may indicate the file data is not present. Those skilled in the art will appreciate there are many ways a file may be identified as such stub/sparse file.

The marker of a sparse file may include information identifying a location from which additional code or code data be obtained. In one embodiment, a sparse file's marker may include data indicating the location from which further data corresponding to the file may be obtained, such as the location of a streaming server. For example, the marker may include an IP address and/or other address information. Additional space may be allocated or reserved for a sparse file to allow for additional data or code to replace the marker in the file's storage location if and when the file is received. Generally speaking, sparse files consume less storage space than the actual files they represent. However, there may be times when more space has been allocated for the header and the marker of a sparse file than is later used to allow the sparse file and/or the marker to be replaced by additional file code or data without increasing the allocated storage space of file.

The majority of files streamed to a requesting client computer may be sparse files, since only a few files of an application may be used to launch and execute the application. Many files corresponding to additional features, such as clip art and foreign language capabilities for a word processing application, may not be utilized during launch or at all during execution. The registering and allocating of thousands of these files, which may be sent as regular files with data or as sparse files, may be time consuming and delay the installation of the streamed application. Rather than register and allocate space for the sparse files during an initial installation, the sparse files may be identified and corresponding metadata may be placed in an index of files on the client computer.

In one embodiment, the files utilized for an initial launch and execution of a streamed application may be identified within a given file. Alternatively, a receiving client computer may determine each file streamed with data and is not a sparse file is utilized during an initial launch and execution of a streamed application. Files with data, which are identified by the client computer to be used during an initial launch and execution of a streamed application, may be physically created on the client computer. For example, space may be allocated for the storage of the header and data, such as in a table entry within the file system.

Both non-sparse and sparse files, which are not identified by the client computer to be used during an initial launch and execution of a streamed application, may not have a unique table entry allocated in a file system. Rather, metadata for these files may be placed in an index of files to be accessed later during the execution of the streamed application. The metadata stored in an index of files may include a file name, a file size, file attributes, file security data, a streamed file identifier (ID), and a marker or flag indicating whether the file has been created. The index of files may be stored on the client computer in a single file or a corresponding file comprised within each folder.

Figure 4:
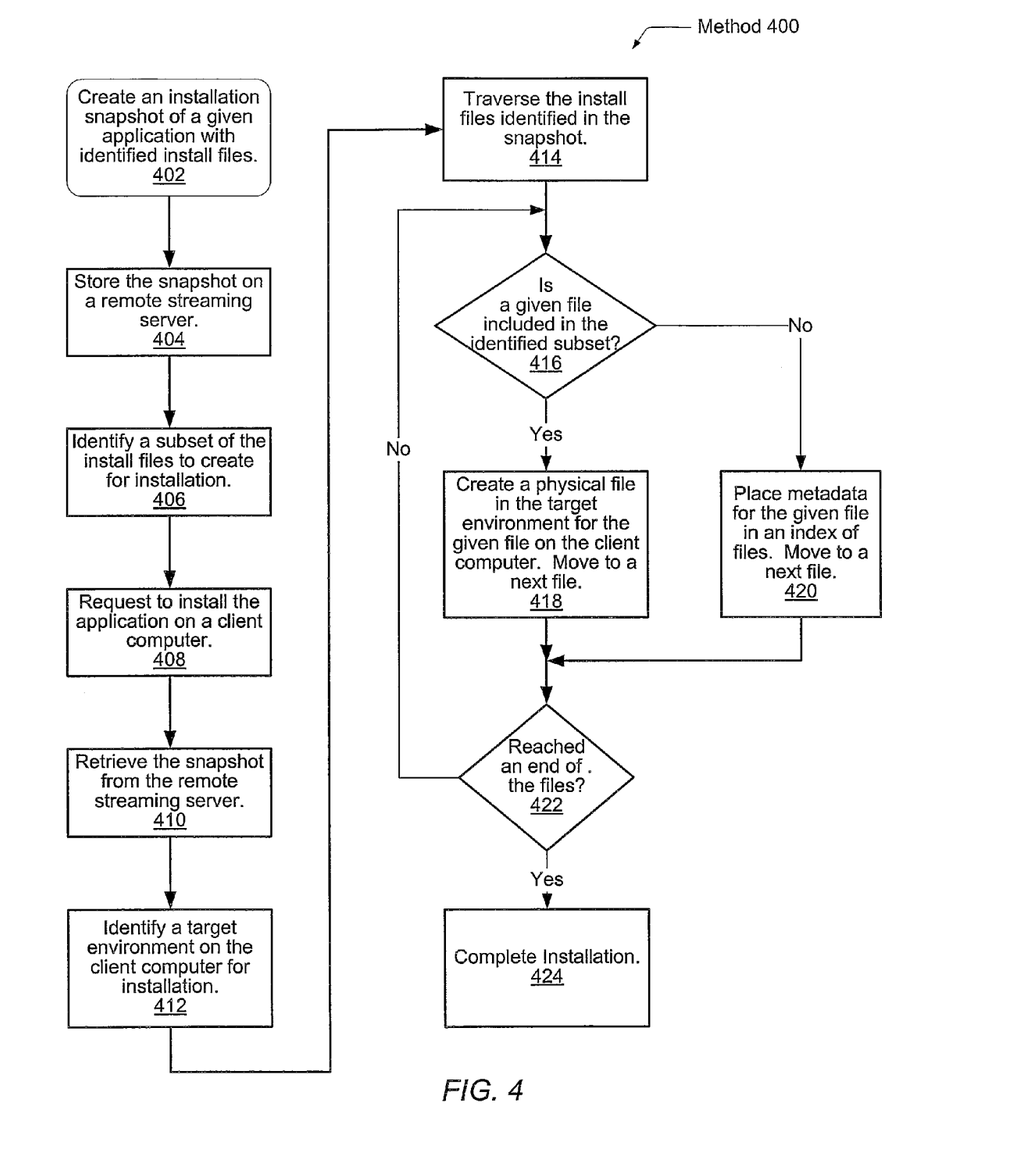
FIG. 4 is a generalized flow diagram illustrating one embodiment of a method for efficient streaming installation.

Turning now to FIG. 4, a generalized flow diagram illustrating one embodiment of a method 400 for efficient streaming installation is shown. The components embodied in network architecture 100 and computing systems 200 and 300 may generally operate in accordance with method 400. It is noted for purposes of discussion, the steps in this embodiment of method 400 are described in sequential order. However, some steps may occur in a different order than shown, some steps may be performed concurrently, some steps may be combined with other steps, and some steps may be absent in another embodiment.

In step 402, an installation snapshot of a given application is created. In one embodiment, files utilized during an initial launch and execution of the application are identified and stored in a file. Alternatively, identification may be included with the files. Further, each file to be streamed with data during an installation may be determined by a receiving client computer to be used during an initial launch and execution of the application. In block 404, the snapshot may be stored on a remote streaming server. In block 406, a subset of the install files to create for installation may be identified if not already done. In block 408, a client computer may receive a request from an end-user to install the application on the client computer.

In block 410, the client computer retrieves the snapshot from the remote streaming server. In block 412, a target environment (non-virtual or virtual) is identified on the client computer for installation. In block 414, in one embodiment, the client computer traverses the received files. Alternatively, the client computer inspects each file as it is received. If a given file is identified by the client computer to be used during an initial launch and execution of the streamed application (conditional block 416), then in block 418, the client computer creates a physical file in the target environment for the given file. Otherwise, in block 420, the client computer places metadata for the given file in an index of files as described earlier. An example of a resulting folder structure may appear as in the following:

+FolderA\
--_streams.db (file1.txt, file2.txt . . . )
--realFile1.txt
+FolderB\
--_streams.db (file3.txt, file4.txt, . . . )

Above, the files denoted as "_streams.db" are the index of files for a corresponding folder. These files comprise metadata for files comprised within a corresponding folder. The file "readFile1.txt" may be a file that is physically created on the client computer. The files "file1.txt" and "file2.txt" may not be physically created yet. If each of the files streamed to the client computer have been inspected (conditional block 422), then installation is complete in block 424.

Figure 5:
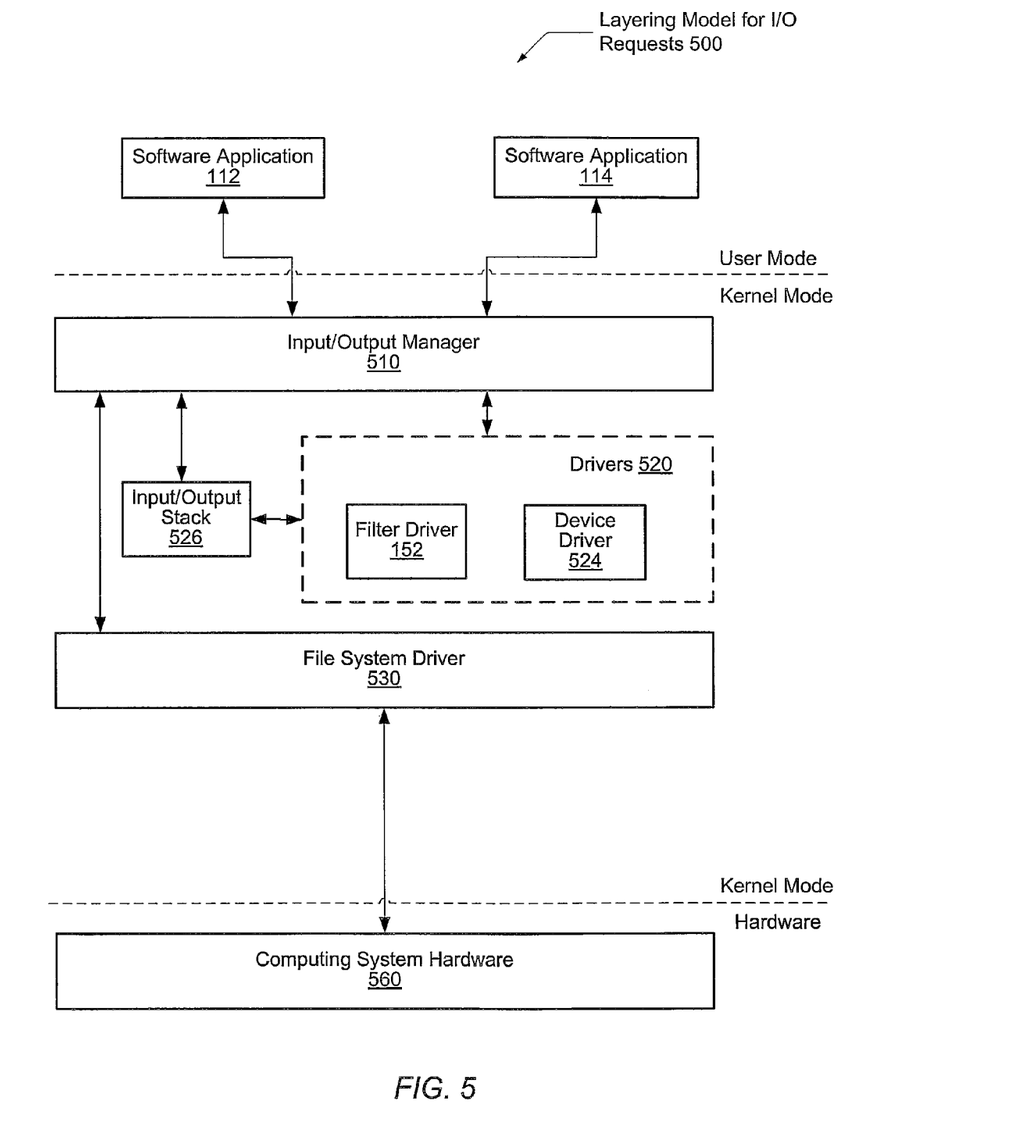
FIG. 5 is a generalized block diagram illustrating one embodiment of an input/output layering model 500 on a client computer.

Turning now to FIG. 5, a generalized block diagram illustrating one embodiment of an input/output layering model 500 on a client computer is shown. As shown, model 500 includes user mode components and kernel mode components. Applications 112 and 114 executing on clients 110a-110e may send read and write, or input/output (I/O), memory requests to an I/O manager 510 on the client computer. Each of the applications 112 and 114 may have been streamed from a remote streaming server at an earlier time. The I/O manager 510 may receive the requests, create one or more corresponding packets, and route these packets to respective drivers.

Several driver layers may be located below the I/O manager 510. These several driver layers, including both intermediate or device drivers 524 and filter drivers 152 within a driver stack 520, may exist between an application and a piece of hardware. Although only a single driver is shown for both a device driver and a filter driver, several drivers of each category may exist within driver stack 520. These drivers may be grouped together in stacks, or stacks within stack 520, that work together to completely process a request targeted at a particular device. A layered driver model is one manner to process I/O requests. In this model, each driver in a stack 520 may be responsible for processing a part of a request. If the request cannot be completed, information for the lower driver in the stack may be set up and the request is passed along to that driver. Such a layered driver model may allow functionality to be dynamically added to a driver stack 520. It also allows each driver to specialize in a particular type of function and decouples it from having to know about other drivers.

Generally speaking, a filter driver 152 may be used to add features to a device or to a software product such as an application-streaming product. The features may be added without modifying the underlying device drivers or the software products. Filter drivers may allow modifications to some aspects of an existing driver's behavior without re-writing the underlying driver. Provided routines within I/O manager 510 may be used to redirect I/O requests to a device object, such as file system 154, to the filter driver 152 instead of forwarding them to the driver managing the target device object, such as file system driver 530. In one embodiment, a filter driver 152 may reside within an application-streaming product. However, the actual location of filter driver 152 may be in another location. The I/O stack 526 may be used to direct requests to the filter driver 152 regardless of its actual location.

In the embodiment illustrated in FIG. 5, the file system driver 530 and shared storage driver stack 540 are shown outside of driver stack 520 to better associate the drivers with the targeted shared storage 160. However, these drivers may still utilize I/O stack 526 and be logically grouped in a stack or sub-stack within driver stack 520. The filter driver that receives the redirected I/O requests to file system driver 530 may then examine, modify, complete, or pass along the requests it receives to the file system driver 530. For example, filter driver 152 may intercept I/O requests to the file system. The filter driver 152 may then inspect both the request and the index of files to determine how to handle the request.

The file system driver 530 may provide a means for users to store information and retrieve it from nonvolatile media such as disks or tapes used in shared storage device 160. The file system driver 530 may be an intended target to receive requests to open, create, read, write and close files on disks. These requests typically originate in a user process, such as a thread executing on the client computer corresponding to instructions of application 112 or 114. These requests are dispatched to the file system driver 530 via the I/O manager 510.

The I/O manager 510 may follow a given protocol regarding received requests. Before forwarding the request, however, the I/O manager 510 may check I/O stack 526 to determine if any other driver is layered over the files system driver 530. If so, the I/O manager 510 may redirect the request to that driver, such as filter driver 152, which may be at the top of the layered list or at least ahead of the file system driver 530. Other filter drivers that add security or other features may be layered above both the filter driver 152 and file system driver 530. Therefore, the filter driver 152 may intercept the I/O request before it reaches the file system driver 530.

The filter driver 152 may manipulate intercepted requests, such as converting them to requests to stream one or more files from a remote streaming server. The retrieved files may be physically created and stored on the client computer. Afterward, the modified requests may be dispatched to the underlying file system driver 530. The file system driver 530 may not realize that some other filter driver is layered above it and may behave as if the I/O manager 510 has sent the I/O request directly to it.

Figure 6:
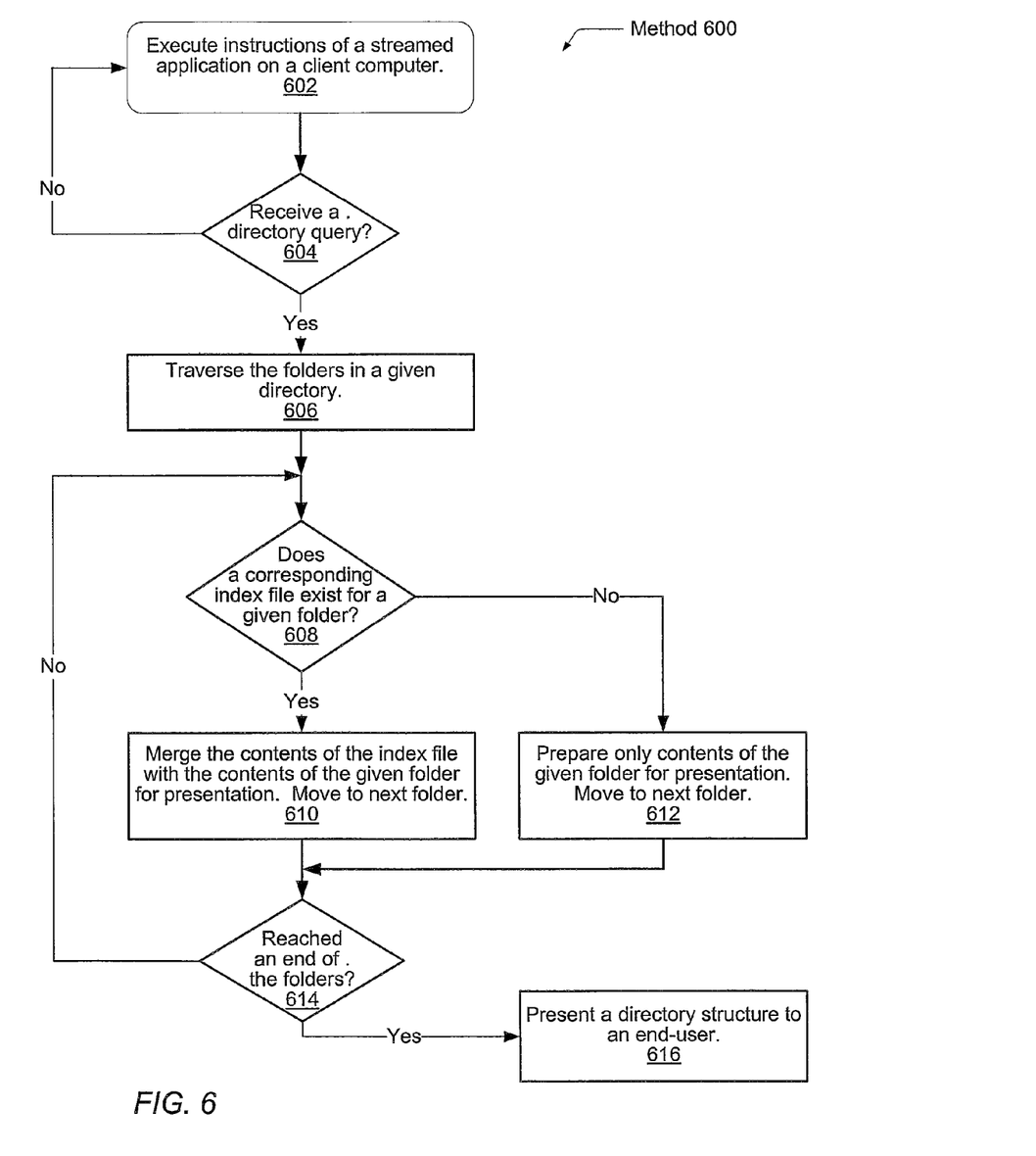
FIG. 6 is a generalized flow diagram illustrating one embodiment of a method for handling file system query requests.

Turning now to FIG. 6, a generalized flow diagram illustrating one embodiment of a method 600 for handling file system query requests is shown. The components embodied in network architecture 100 and computing systems 200 and 300 may generally operate in accordance with method 600. It is noted for purposes of discussion, the steps in this embodiment of method 600 are described in sequential order. However, some steps may occur in a different order than shown, some steps may be performed concurrently, some steps may be combined with other steps, and some steps may be absent in another embodiment.

In step 602, a client computer executes instructions of an application, which was previously streamed. If a file system directory query request is generated (conditional block 604), then in block 606, the client computer traverses the folders in a given directory corresponding to the request. An example of a file system directory query request is Microsoft's IRP_MJ_DIRECTORY_CONTROL request. If a corresponding index of files exists for a given folder within the directory (conditional block 608), then in block 610, a streaming filter driver on the client computer merges the contents of the index of files with the contents of the given folder for presentation. Again, an example of a folder structure may appear as in the following:

+FolderA\
--_streams.db (file1.txt, file2.txt . . . )
--realFile1.txt
+FolderB\
--_streams.db (file3.txt, file4.txt, . . . )

An example of the merged contents may appear as in the following:

FolderA\
--file1.txt
--file2.txt
--realFile1.txt
+FolderB\
--file3.txt
--file4.txt If a corresponding index of files does not exist for a given folder within the directory (conditional block 608), then in block 612, the client computer may prepare only contents of the given folder for presentation. If the streaming filter driver has inspected each of the corresponding folders (conditional block 614), then in block 616, the directory structure is presented to an end-user or a user application. The folder structure shown above may be used and the directory is presented as if the files within the index of files are physically created when in fact they are not created.

Figure 7:
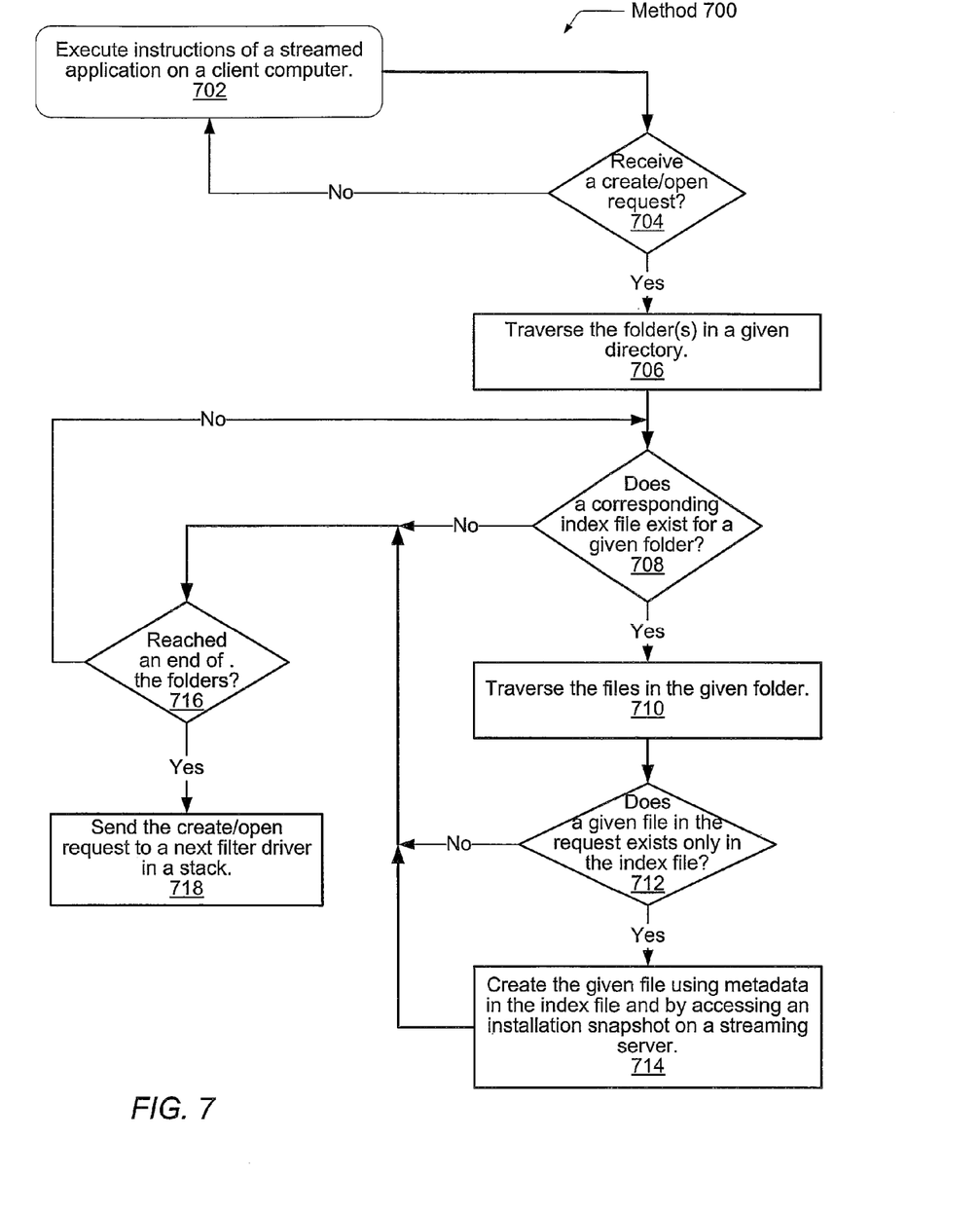
FIG. 7 is a generalized flow diagram illustrating one embodiment of a method for handling open or create requests on files, folders, or directories.

Turning now to FIG. 7, a generalized flow diagram illustrating one embodiment of a method 700 for handling open or create requests on files, folders, or directories is shown. The components embodied in network architecture 100 and computing systems 200 and 300 may generally operate in accordance with method 800. It is noted for purposes of discussion, the steps in this embodiment of method 00 are described in sequential order. However, some steps may occur in a different order than shown, some steps may be performed concurrently, some steps may be combined with other steps, and some steps may be absent in another embodiment.

In step 702, a client computer executes instructions of an application, which was previously streamed. If an open/create request is generated (conditional block 704), then in block 706, the client computer traverses the folders in a given directory corresponding to the request. An example of an open or create request is Microsoft's IRP_MJ_CREATE request. If a corresponding index of files exists for a given folder within the directory (conditional block 708), then in block 710, a streaming filter driver traverses the files within the given folder.

If a given file corresponding to the request exists only in an index of files corresponding to the folder (conditional block 712), then in block 714, the streaming filter driver may send a retrieval request to a remote streaming server for data corresponding to the file. After receiving the data, the file may be created. The metadata corresponding to the given file, which is stored in the index of files, may be used for the retrieval request and the physical creation of the given file. If each of the folders in a directory corresponding to the open or create request has been traversed (conditional block 716), then in block 718, the request is forwarded and the newly created file(s) may be opened by subsequent filter drivers.

It is noted that the above-described embodiments may comprise software. In such an embodiment, program instructions and/or a database (both of which may be referred to as "instructions") that represents the described systems and/or methods may be conveyed or stored on a computer readable medium. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer implemented method comprising:
performing, by a client, an installation procedure to install on the client a streamed application received from a server, wherein the streamed application comprises a plurality of files with a subset of the plurality of files being sparse files, wherein said performing the installation procedure includes:
if a given file of the plurality of files is not a sparse file:

identifying, by the client, a particular location on the client where the given file is to be installed during the installation procedure; and installing, by the client, the given file in the particular location during the installation procedure;

if the given file is a sparse file:

determining, by the client, not to install the given file on the client during the installation procedure;

identifying, by the client, the particular location as being designated for installing the given file at a subsequent time after the installation procedure has completed; and storing, by the client, an identification of the given file in an index file associated with the particular location, wherein said identification identifies the given file and indicates the given file is not currently installed on the client.

2. The method as recited in claim 1, further comprising:
intercepting, by the client, an access request directed to a first location of a file system of the client; and
determining, by the client, a particular file corresponding to the access request is not currently installed on the client in response to detecting the first location includes an index file that indicates the particular file is not currently installed.

3. The method as recited in claim 2, further comprising retrieving and installing, by the client, the particular file in the particular location by using metadata in the index file to request the particular file from a streaming server.

4. The method as recited in claim 3, wherein the access request is intercepted by a filter driver, and wherein the filter driver forwards the access request to the file system for accessing the particular file subsequent to the particular file being installed.

5. The method as recited in claim 2, wherein in response to determining the access request is a directory query access request, the method further comprises merging, by the client, an identification of files installed in the directory with an identification of files that are not installed in the directory, the identification of files that are not installed in the directory being included in the index file.

6. The method as recited in claim 4, wherein the index file includes an identification of one or more files not installed in the particular location which would be within the particular location were they installed on the client.

7. The method as recited in claim 6, wherein the index file further includes for each file identified in the index file, one or more of: a file name, a file size, file attributes, file security, a streamed file identifier (ID), and a marker indicating whether the file has been installed.

8. The method as recited in claim 7, wherein the target environment is one of the following: a physical environment or a virtual environment.

9. A computing system comprising:
a streaming server configured to stream a plurality of files corresponding to an installation snapshot, wherein the installation snapshot corresponds to a given application;
a client computer coupled to receive the plurality of files from the streaming server, wherein the plurality of files includes a subset of files that are sparse files, wherein the client computer is configured to perform an installation procedure to install the application on the client computer;
wherein if a given file of the plurality of files is not a sparse file, the client is configured to:
identify a particular location on the client where the given file is to be installed during the installation procedure; and
install the given file in the particular location during the installation procedure;
wherein if the given file is a sparse file, the client is configured to:
determine not to install the given file on the client during the installation procedure;
identify the particular location as being designated for installing the given file at a subsequent time after the installation procedure has completed; and
store an identification of the given file in an index file associated with the particular location, wherein said identification identifies the given file and indicates the given file is not currently installed on the client.

10. The computing system of claim 9, wherein the client computer comprises a streaming filter driver configured to:
intercept an access request directed to a first location of a file system of the client; and
determine a particular file corresponding to the access request is not currently installed on the client in response to detecting the first location includes an index file that indicates the particular file is not currently installed.

11. The computing system of claim 10, wherein the client is further configured to retrieve and install the particular file in the particular location by using metadata in the index file to request the particular file from a streaming server.

12. The computing system of claim 11, wherein the access request is intercepted by a filter driver, and wherein the filter driver forwards the access request to the file system for accessing the particular file subsequent to the particular file being installed.

13. The computing system of claim 10, wherein in response to determining the access request is a directory query access request, the client is further configured to merge an identification of files installed in the directory with an identification of files that are not installed in the directory, the identification of files that are not installed in the directory being included in the index file.

14. The computing system of claim 12, wherein the index file includes an identification of one or more files not installed in the particular location which would be within the particular location were they installed on the client.

15. The computing system of claim 14, wherein the index file further includes for each file identified in the index file, one or more of: a file name, a file size, file attributes, file security, a streamed file identifier (ID), and a marker indicating whether the file has been installed.

16. The computing system of claim 15, wherein the target environment is one of the following: a physical environment or a virtual environment.

17. A non-transitory computer-readable storage medium storing program instructions,
wherein the program instructions are executable by a client to cause the client to perform an installation procedure to install on the client a streamed application received from a server, wherein the streamed application comprises a plurality of files with a subset of the plurality of files being sparse files;
wherein in performing the installation procedure the program instructions are executable to cause the client to:
if a given file of the plurality of files is not a sparse file:
identify a particular location on the client where the given file is to be installed during the installation procedure; and install the given file in the particular location during the installation procedure;

if the given file is a sparse file:
    determine not to install the given file on the client during the installation procedure;
    identify the particular location as being designated for installing the given file at a subsequent time after the installation procedure has completed; and
    store an identification of the given file in an index file associated with the particular location, wherein said identification identifies the given file and indicates the given file is not currently installed on the client.

18. The non-transitory computer-readable storage medium of claim 17, wherein the program instructions are further executable to cause the client to:
    intercept an access request directed to a first location of a file system of the client; and
    determine a particular file corresponding to the access request is not currently installed on the client in response to detecting the first location includes an index file that indicates the particular file is not currently installed.

19. The non-transitory computer-readable storage medium of claim 18, wherein the program instructions are further executable to cause the client to retrieve and install the particular file in the particular location by using metadata in the index file to request the particular file from a streaming server.

20. The non-transitory computer-readable storage medium of claim 18, wherein the access request is intercepted by a filter driver, and wherein the filter driver forwards the access request to the file system for accessing the particular file subsequent to the particular file being installed.

* * * * *